United States Patent [19]

Marchetti et al.

[11] 3,796,894

[45] Mar. 12, 1974

[54] ELECTRONIC SWITCHING SYSTEM

[75] Inventors: Gianfranco Marchetti, Monza; Alterto Tronconi, Rovescala, both of Italy

[73] Assignee: Societa Italiana Telecommunicazioni Siemens S.p.A., Milan, Italy

[22] Filed: Apr. 5, 1972

[21] Appl. No.: 241,280

[30] Foreign Application Priority Data

Apr. 6, 1971 Italy .................................. 22767/71

[52] U.S. Cl. .................. 307/257, 307/254, 307/255

[51] Int. Cl. .......................................... H03k 17/00

[58] Field of Search ..................... 307/257; 328/308; 323/75 F

[56] References Cited

UNITED STATES PATENTS

| | | | |
|---|---|---|---|
| 3,159,751 | 12/1964 | Bogdan, Jr. et al. | 308/257 X |
| 3,389,272 | 6/1968 | Cherry | 307/257 |
| 3,402,353 | 9/1968 | Hubbs | 328/208 X |
| 3,179,817 | 4/1965 | Bounsall | 307/257 X |
| 3,449,596 | 6/1969 | Milberger et al. | 307/257 |
| 3,573,501 | 4/1971 | Diehl | 307/257 |
| 3,127,564 | 3/1964 | Giger | 307/257 |

*Primary Examiner*—Rudolph v. Rolinec
*Assistant Examiner*—B. P. Davis
*Attorney, Agent, or Firm*—Karl F. Ross; Herbert Dubno

[57] ABSTRACT

An electronic switching system, particularly for a base band of video signals, comprises a diode bridge with a signal source and a load connected to respective ends of a main diagonal and a pair of normally blocked switching transistors connected between respective ends of a control diagonal and opposite terminals of a d-c supply. The two switching transistors are of opposite conductivity types and are cascaded to conduct simultaneously upon the application of an unblocking voltage to one of them, thereby causing a biasing current to flow in parallel through two pairs of bridge diodes in their forward direction. In the absence of this biasing current, the control diagonal is virtually short-circuited by a low-resistance path including either a pair of serially connected ancillary diodes with grounded junction or two ancillary transistors, also of opposite conductivity types, which are cut off in the conductive condition of the switching transistors.

6 Claims, 5 Drawing Figures

ELECTRONIC SWITCHING SYSTEM

Our present invention relates to an electronic switching system for selectively blocking and unblocking a signal path such as, for example, a channel carrying a base band of video signals ranging up to about 5 MHz.

Such a switching system is useful, for instance, in periodically or randomly monitoring the outputs of several television cameras at a transmitting station or in checking different program (e.g., commercials) to be fed at certain times to a transmitter from a variety of video tapes or other sources.

The general object of our invention is to provide an improved switching system for the purpose set forth which allows a virtually instantaneous changeover between open and closed circuit and, in the open-circuit condition, sharply attenuates the signals of the blocked channel so as to avoid distortion of signals from another channel and to prevent cross-talk between the several channels.

A more particular object is to provide a system of this character which attains the aforestated desiderata with a minimum number of active components (e. g., transistors) and which can be conveniently realized with integrated-circuit technique.

An electronic switching system embodying our invention includes a conventional rectifier bridge of the type using four diodes in respective arms thereof, connected in two parallel branches of like polarity between a first and a second bridge corner together defining a control diagonal; the junctions of the two serially connected diodes of each branch constitute a third and a fourth bridge corner together defining a main diagonal for the passage of the controlled signals, these third and fourth corners being respectively connected to the signal source and to a load such as, for example, a monitoring viewer. The bridge is biased, in accordance with our invention, by a circuit arrangement including a direct-current supply whose positive and negative terminals are connected to the respective corners of the control diagonal through a first and a second transistor of opposite conductivity types (NPN and PNP) hereinafter referred to as switching transistors. These switching transistors are so poled as to pass, in their conductive condition, a biasing current through the two branches of the bridge in the forward direction of all its diodes so that, upon a simultaneous reversal of the state of conductivity of these transistors, the flow of this biasing current is alternately blocked and unblocked. Such a reversal of the switching transistors can be brought about by a simple keying of the base voltage of one transistor (e.g., the first transistor) whose collector is connected to the base of the other (e.g., the second) transistor so that the two transistors operate as a pair of cascaded switching stages. Furthermore, the corners of the control diagonal are bridged by electronic circuitry which responds to the biasing current for establishing a low-resistance shunt path across these corners in the nonconductive condition of the switching transistors.

Advantageously, the conductivity types of the switching transistors are so chosen that their emitters can be tied directly to the corresponding supply terminals to which their bases are also joined via resistive connections so that base and emitter are at the same position if no extraneous voltage is applied thereto, the transistor being substantially cut off under these conditions. The first transistor, inserted between the negative supply terminal and the bridge, should therefore be of NPN type while the second one is of PNP type. The presence of resistors of like magnitude in the collector leads of these transistors balances the bridge with reference to ground in both switching conditions.

The electronic circuitry substantially short-circuiting the control diagonal in the open-switch condition may include two ancillary transistors of opposite conductivity types interconnected in essentially the same manner as the switching transistors, i. e., a third (preferably PNP) transistor inserted between the positive supply terminal and the first bridge corner and a fourth preferably PNP transistor inserted between the negative supply terminal and the second bridge corner. With these ancillary transistors so coupled to the switching transistors as to saturate when the latter are cut off, and vice versa, the shunt path across the control diagonal extends through these ancillary transistors and the d-c supply which is assumed to be of low internal impedance.

Any modulation by the blocked signal of the small reverse current flowing through the bridge by way of these ancillary transistors in the open-switch condition is, therefore, effectively prevented from reaching the load.

In a simplified modification designed for signals of relatively low amplitude (e.g., up to about ±1.2 V) the ancillary transistors may be replaced by resistors in combination with a pair of ancillary diodes which are serially connected across the control diagonal with a polarity opposite that of the bridge diodes so as to offer a high resistance to the biasing current of the switching transistors, a common terminal of these ancillary diodes being connected to a neutral point (usually ground) of the d-c supply. In the closed-switch condition, i.e., with the switching transistors conducting, a potential difference of blocking polarity corresponding to the small voltage drop across the bridge is developed on the control diagonal so as to make the ancillary diodes virtually impassable to low-amplitude a-c signals.

In the open-switch condition these ancillary diodes conduct and effectively shunt to ground any residual signals traversing the diodes in the input-side branch of the bridge. In this case, therefore, the internal impedance of the d-c supply is not involved.

The invention will be described in greater detail hereinafter with reference to the accompanying drawing in which.

Figures 1, 2:
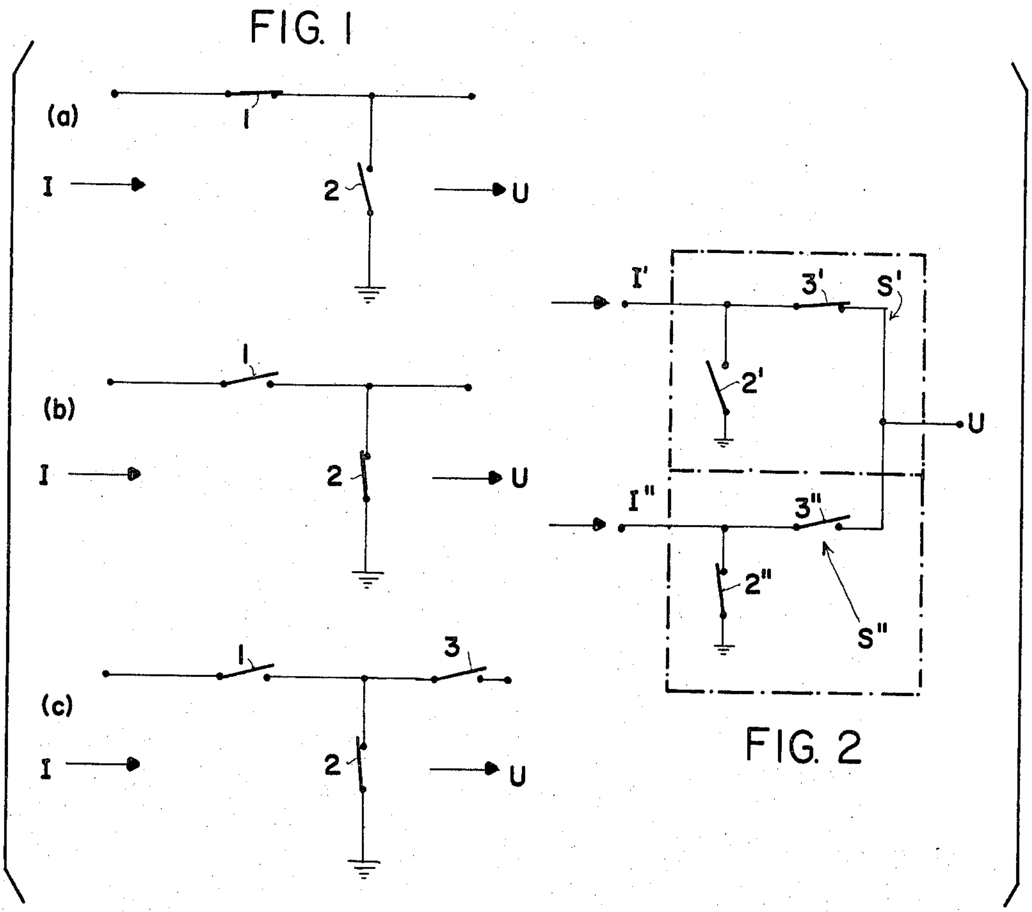
FIG. 1, FIG. 2 PRIOR ART
FIG. 1 is a set of diagrams showing different operating positions of conventional switching systems of the general character here envisaged.
FIG. 2 shows another switching arrangement of the prior art.

Diagram (a) of FIG. 1 illustrates the principle of a switching system operable to cut off the flow of alternating-current signals normally passing from a source I to a load U. A switch 1, closed during signal transmission, is opened to break the circuit while another switch 2 in shunt with the load is simultaneously closed to leak off residual oscillations which may be transmitted (e.g., capacitively) over the open circuit. This alternate position has been illustrated in diagram (b). Switches 1 and 2 may be constituted by purely electronic elements such as transistors to permit a rapid changeover between open and closed circuit; in the frequency range here contemplated (up to about 5 MHz), however, the maximum signal attenuation in the position of diagram (b) generally is only about 50 dB. Also the grounding of the output lead by shunt switch 2 prevents the multipling of several channels to that lead for selective transmission of their signals to the load. This latter drawback is remedied in the modified prior-art system of diagram (c) where a third switch 3 lies beyond shunt switch 2 in series with switch 1, opening and closing simultaneously therewith.

With relatively complex circuitry including eight transistors, such a system may attain an attenuation up to about 75 or 80 dB.

FIG. 2 shows the multipling of several switching circuits S′ and S″ for the selective feeding of signals from respective sources I′ and I″ to a common load U. Each of these circuits is generally similar to that of diagram (c) OF FIG. 1, comprising a shunt switch 2′, 2″ and a series switch 3′, 3″ beyond the latter; the input switch (1) has not been shown and could in fact be omitted.

The system shown in FIG. 2 is inherently unbalanced and, unless one of the switches 3′ and 3″ is always closed, will develop a varying d-c component resulting in a distinct voltage jump upon the closure of one of its signal paths.

Figure 3:
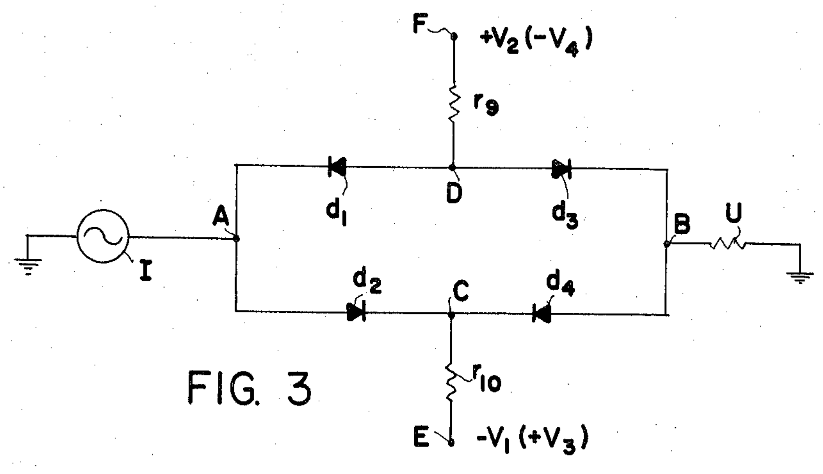
FIG. 3 is a circuit diagram of a rectifier bridge and associated biasing means as utilized in a system according to our invention.

FIG. 3 shows one of the basic components of our improved switching system. This component is essentially a rectifier bridge with corners A, B defining a main diagonal end corners C, D defining a control diagonal. The four arms of the bridge are constituted by respective diodes $d_1$, $d_2$ and $d_3$, $d_4$ all oriented with their anodes toward junction D and with their cathodes toward junction C. Upon the application of a negative biasing voltage $-V_1$ to a terminal E, connected to corner C through a series resistor $r_{10}$, and a positive biasing voltage $+V_2$ of like magnitude to a terminal F, connected to corner D via a series resistor $r_9$, a biasing current flows through two parallel branches respectively consisting of diodes $d_1$, $d_2$ and diodes $d_3$, $d_4$. The diode junction A of the first branch, on the input side of the bridge, is connected to the signal source I whereas the corresponding junction B of the second branch, on the output side, leads to the load U. The flow of biasing current through resistors $r_9$ and $r_{10}$ renders the bridge conductive for the passage of a-c signals from source I to load U. Such conduction, however, is blocked upon the application of a positive voltge $+V_3$ to terminal E and of a negative voltage $-V_4$ of preferably the same magnitude to terminal F.

The two branches $d_1$, $d_2$ and $d_3$, $d_4$ of the diode bridge shown in FIG. 3 thus perform the functions of series switches 1 and 3 in diagram (c) of FIG. 1 but cannot replace the shunt switch 2 thereof. The system according to our invention, as described hereinafter with reference to FIGS. 4 and 5, provides an equivalent for the latter switch by electronic circuitry establishing a virtual short circuit between junctions C and D in the absence of the aforementioned biasing current, this short circuit being broken in response to the flow of that current.

Figure 4:
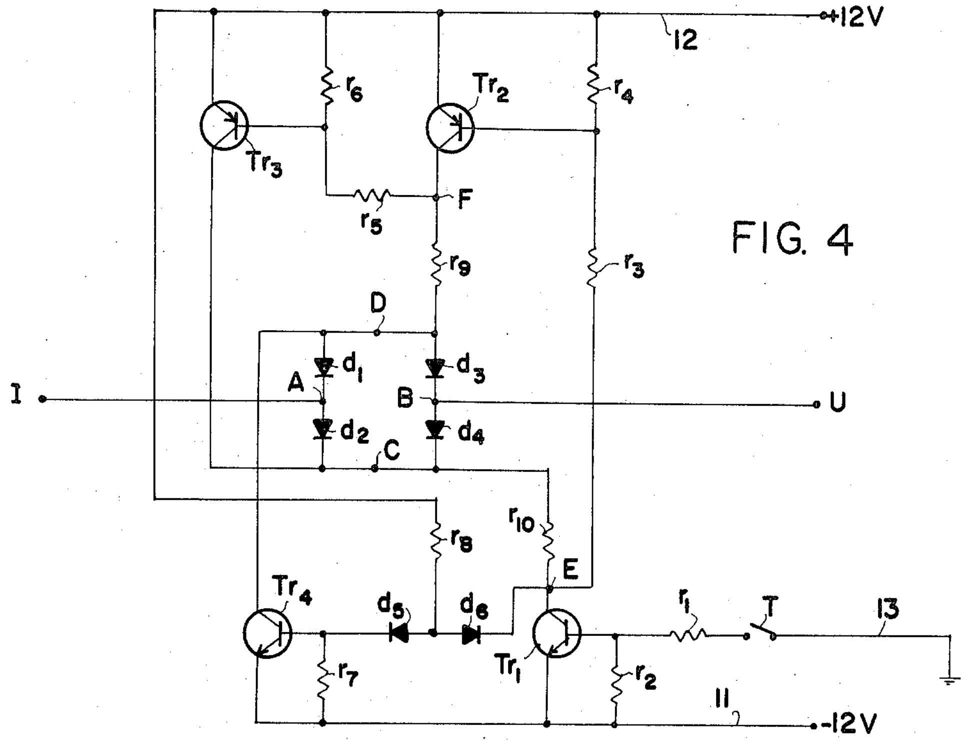
FIG. 4 is a circuit diagram of an electronic switching system embodying the invention.

In FIG. 4 we have shown a negative bus bar 11 and a positive bus bar 12 maintained at −12V and +12V, respectively, by a d-c power supply not further illustrated. Bus bar 11 is connected to the emitter of a first transistor $Tr_1$ whose base is joined to that bus bar through a resistor $r_2$ and is connectable through a resistor $r_1$ and a manual or electronic switch T to a lead 13 of relatively positive potential (ground); the collector of transistor $Tr_1$ is connected to bus bar 12 through a voltage divider consisting of two resistors $r_3$ and $r_4$ whose junction is tied to the base of a second transistor $Tr_2$ having its emitter directly joined to bus bar 12. Transistor $Tr_1$, which is of NPN conductivity type, and transistor $Tr_2$, which is of the opposite conductivity type PNP, are serially interconnected via the aforedescribed biasing circuit including resistors $r_9$, $r_{10}$ and diode pairs $d_1$, $d_2$ and $d_3$, $d_4$. With switch T open, the bases of both switching transistors $Tr_1$, $Tr_2$ are at the potentials of their respective emitters so that their resistance is very high; closure of switch T causes the saturation of transistor $Tr_1$ whose collector current instantly drives the base of transistor $Tr_2$ relatively negative, i.e., to approximately ground potential if resistors $r_3$ and $r_4$ are substantially identical, so that transistor $Tr_2$ also saturates and passes the biasing current through bridge $d_1 - d_4$. This is the condition represented in FIG. 3 by the application of voltages $-V_1$ and $+V_2$ to the respective biasing terminals E and F which in FIG. 4 are constituted by the collectors of the two switching transistors.

Another voltage divider, connected between point F (i.e., the collector of transistor $Tr_2$) and bus bar 12, consists of two resistors $r_5$ and $r_6$ which (like resistors $r_3$ and $r_4$) are of large magnitude compared with biasing resistors $r_9$ and $r_{10}$. The junction of resistors $r_5$ and $r_6$ is connected to the base of a further PNP transistor $Tr_3$ whose emitter is directly energized by bus bar 12 and whose collector is tied to bridge corner C. In an analogous manner a fourth transistor $Tr_4$ of NPN type has its emitter connected to bus bar 11 and its collector joined to bridge corner D; the base of transistor $Tr_4$ is connected to the junction of a resistor $r_7$ with a diode $d_5$ constituting with a further resistor $r_8$ a voltage divider inserted between bus bars 11 and 12. Through a diode $d_6$, positioned back-to-back with diode $d_5$, the junction of the latter diode with resistor $r_8$ is connected to point E, i.e., to the collector of resistor $Tr_1$. In the nonconductive condition of switching transistor $Tr_1$, therefore, the small current flowing through tbe large resistors $r_7$ and $r_8$ as well as diode $d_5$ biases the base of ancillary transistor $Tr_4$ to substantially ground potential so that this ancillary transistor is saturated and applies negative potential ($-V_4$ in FIG. 3) to bridge corner D. At the same time, the collector current drawn by transistor $Tr_4$ through resistors $r_6$, $r_5$, $r_9$ biases the base of ancillary transistor $Tr_3$ also to approximately ground potential, the combined resistance of saturated transistor $Tr_4$ and resistor $r_9$ being negligible compared with that of the two substantially identical resistors $r_5$ and $r_6$. Transistor $Tr_3$ therefore saturates and applies to bridge corner C a positive voltage as indicated at $+V_3$ in FIG. 3. Under these conditions, the four diodes $d_1 - d_4$ of the bridge are strongly reverse-biased so as to block conduction between junctions A and B. Since the impedance of the shunt path from junction D through transistor $Tr_4$, current supply ±12V and transistor $Tr_3$ to junction C is low compared with that of the reverse-biased diodes $d_3$ and $d_4$, any signal components clearing the diodes $d_1$ and $d_2$ at this time will be severely attenuated before reaching the load U. Upon the subsequent closure of switch T to saturate the switching transistors $Tr_1$ and $Tr_2$, ancillary transistors $Tr_3$ and $Tr_4$ are cut off so that the shunt path is open and signals pass normally from source I to load U.

Figure 5:
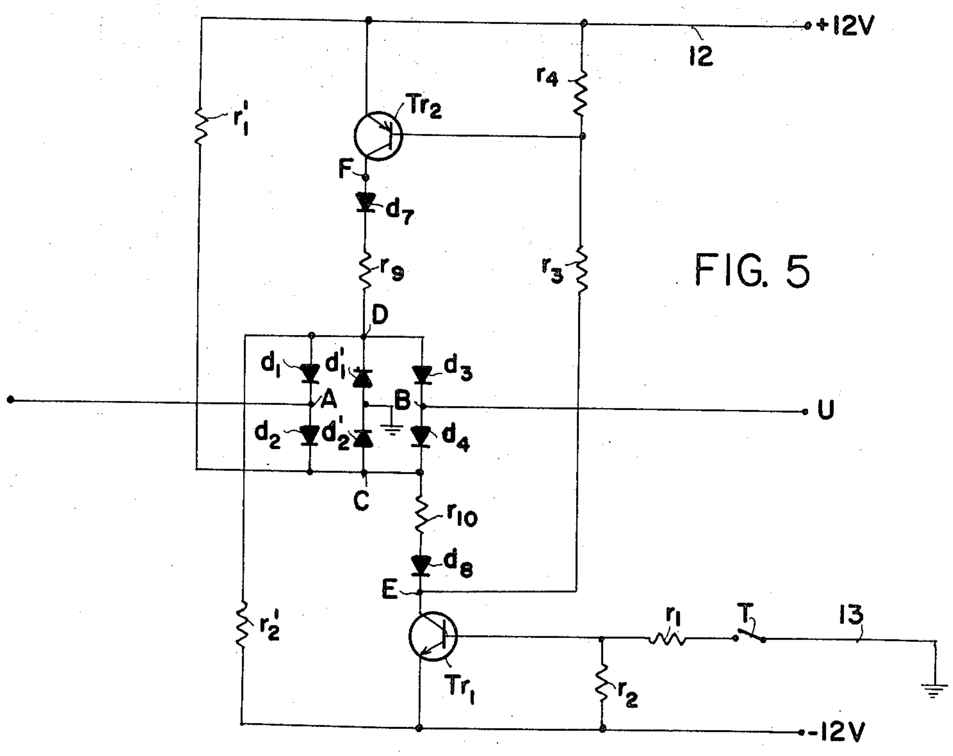
FIG. 5 is a similar circuit diagram illustrating another embodiment.

In the modified system shown in FIG. 5, ancillary transistors $Tr_3$ and $Tr_4$ have been replaced by two resistors $r'_1$, $r'_2$ whereas two ancillary diodes $d'_1$, $d'_2$ are connected in series between points C and D; these ancillary diodes, whose junction is grounded, have a polarity opposite that of diodes $d_1 - d_4$ so that their presence does not significantly affect the magnitude of the biasing current flowing through diodes $d_1 - d_4$ upon closure of switch T. The voltage drop generated by this biasing current between points C and D back-biases the ancillary diodes $d'_1$ and $d'_2$ so that signals not exceeding a peak-to-peak voltage of about 2.5 V cannot pass through them. Upon the opening of switch T, residual signal components traversing the diodes $d_1$ and $d_2$ are shunted to ground through diodes $d'_1$ and $d'_2$.

A diode $d_8$ between point E and resistor $r_{10}$ prevents the grounding of voltage divider $r_3$, $r_4$ through that resistor and is balanced bp a similar diode $d_7$ between point F and resistor $r_9$.

The system according to our invention introduces an attenuation of greater than 95 dB for signals up to about 5 MHz in the open-switch condition, with extremely short switchover periods on the order of 100 nsec.

We claim:

1. An electronic switching system comprising:

a rectifier bridge including four diodes in respective bridge arms forming two parallel branches of the same polarity between a first bridge corner and a second bridge corner, said branches consisting each of two bridge arms in series with junctions constituting a third and a fourth bridge corner, said third and fourth corners being respectively connectable to a source of alternating-current signals and to a load;

biasing means for said bridge including a direct-current supply with a positive and a negative supply terminal, a first transistor of one conductivity type inserted between one supply terminal and said first corner, and a second transistor of opposite conductivity type inserted between the other supply terminal and said second corner, said transistors being so poled as to pass in their conductive condition a biasing current through said branches in the forward direction of all said diodes;

control means for simultaneously reversing the state of conductivity of said first and second transistors, thereby alternately blocking and unblocking the flow of said biasing current, said first transistor having an input electrode connected to said control means and an output electrode connected to an input electrode of said second transistor; and electronic circuit means responsive to said biasing current for establishing a low-resistance shunt path between said first and second corners in the nonconductive condition of said first and second transistors, said electronic circuit means comprising a third transistor of said one conductivity type inserted between said one supply terminal and said second corner, said third transistor having an input electrode connected to an output electrode of said second transistor, and a fourth transistor of said opposite conductivity type inserted between said other supply terminal and said first corner, said fourth transistor having an input electrode connected to the output electrode of said first transistor.

2. A switching system as defined in claim 1 wherein said first and second transistors each include an emitter connected to the associated supply terminal, a base constituting its input electrode and a collector constituting its output electrode, said biasing means further including a first resistive connection from the base of said first transistor to said one supply terminal, a second resistive connection from the base of said second transistor to said other supply terminal, a first series resistor between the collector of said first transistor and said first corner, and a second series resistor of substantially the same magnitude between the collector of said second transistor and said second corner.

3. A switching system as defined in claim 2 wherein said first and second transistors are of NPN and PNP type, respectively.

4. A switching system as defined in claim 1 wherein the connection between said output electrode of said first transistor and said input electrode of said fourth transistors includes two further diodes connected back-to-back and having a junction connected to one of said supply terminals.

5. A switching system as defined in claim 1 wherein said input electrodes are bases and said output electrodes are collectors, said first and fourth transistors being of NPN type and having each an emitter tied to said negative supply terminal, said second and third transistors being of PNP type and having each an emitter tied to said positive supply terminal.

6. A switching system as defined in claim 1 wherein said four diodes are poled to pass current from said second corner to said first corner, said first transistor being of NPN type and inserted between said first corner and said negative supply terminal, said second transistor being of PNP type and inserted between said second corner and said positive supply terminal.

* * * * *

PO-1050
(5/69)

UNITED STATES PATENT OFFICE
CERTIFICATE OF CORRECTION

Patent No. 3,796,894 Dated 12 March 1974

Inventor(s) Gianfranco MARCHETTI et al (Alberto TRONCONI)

It is certified that error appears in the above-identified patent and that said Letters Patent are hereby corrected as shown below:

In the heading, line [75], for the second inventor's first name "Alterto" read -- Alberto -- .

Signed and sealed this 9th day of July 1974.

(SEAL)
Attest:

McCOY M. GIBSON, JR.
Attesting Officer

C. MARSHALL DANN
Commissioner of Patents